US008102682B2

(12) United States Patent
Haimer et al.

(10) Patent No.: US 8,102,682 B2
(45) Date of Patent: Jan. 24, 2012

(54) POWER SUPPLY CONTROL CIRCUIT FOR AN INDUCTIVE COIL USED TO HEAT A TOOL SHRINK ATTACHMENT

(75) Inventors: Franz Haimer, Igenhausen (DE); Jiři Fořt, Zliv (CZ)

(73) Assignee: Franz Haimer Maschinebau KG, Hollenbach-igenhausen (DE)

( * ) Notice: Subject to any disclaimer, the term of this patent is extended or adjusted under 35 U.S.C. 154(b) by 702 days.

(21) Appl. No.: 12/065,248

(22) PCT Filed: Aug. 28, 2006

(86) PCT No.: PCT/EP2006/008413

§ 371 (c)(1),
(2), (4) Date: Apr. 16, 2008

(87) PCT Pub. No.: WO2007/028523

PCT Pub. Date: Mar. 15, 2007

(65) Prior Publication Data

US 2008/0219034 A1 Sep. 11, 2008

(30) Foreign Application Priority Data

Sep. 7, 2005 (DE) ........................ 10 2005 042 615

(51) Int. Cl.
*H02M 5/40* (2006.01)

(52) U.S. Cl. ............................... 363/34; 363/36; 363/37

(58) Field of Classification Search .................... 363/34, 363/36, 37

See application file for complete search history.

(56) References Cited

U.S. PATENT DOCUMENTS 4,626,978 A * 12/1986 Thouvenin ...................... 363/36
4,638,138 A * 1/1987 Rosa et al. .................... 219/668
4,876,637 A * 10/1989 Mose et al. ...................... 363/37
5,053,939 A * 10/1991 Kirchberg et al. .............. 363/41
5,483,140 A * 1/1996 Hess et al. .................... 318/802
5,504,667 A * 4/1996 Tanaka et al. ................... 363/37
6,031,738 A * 2/2000 Lipo et al. ........................ 363/37
7,372,174 B2 * 5/2008 Jones et al. ...................... 290/44

(Continued)

FOREIGN PATENT DOCUMENTS

DE 19527827 C2 1/1997
DE 20008937 U1 8/2000
DE 10129645 B4 5/2003

(Continued)

*Primary Examiner* — Jeffrey Sterrett
(74) *Attorney, Agent, or Firm* — Marsh Fischmann & Breyfogle LLP

(57) ABSTRACT

A circuit 1 for controlling the supply of electrical power to an induction coil 2, in particular to an induction coil 2 for heating a shrink attachment for tools, comprises a rectifier 3, having an input 3*a*, 3*b*, 3*c* for feeding an input power, and a rectifier output.

Figure 1:
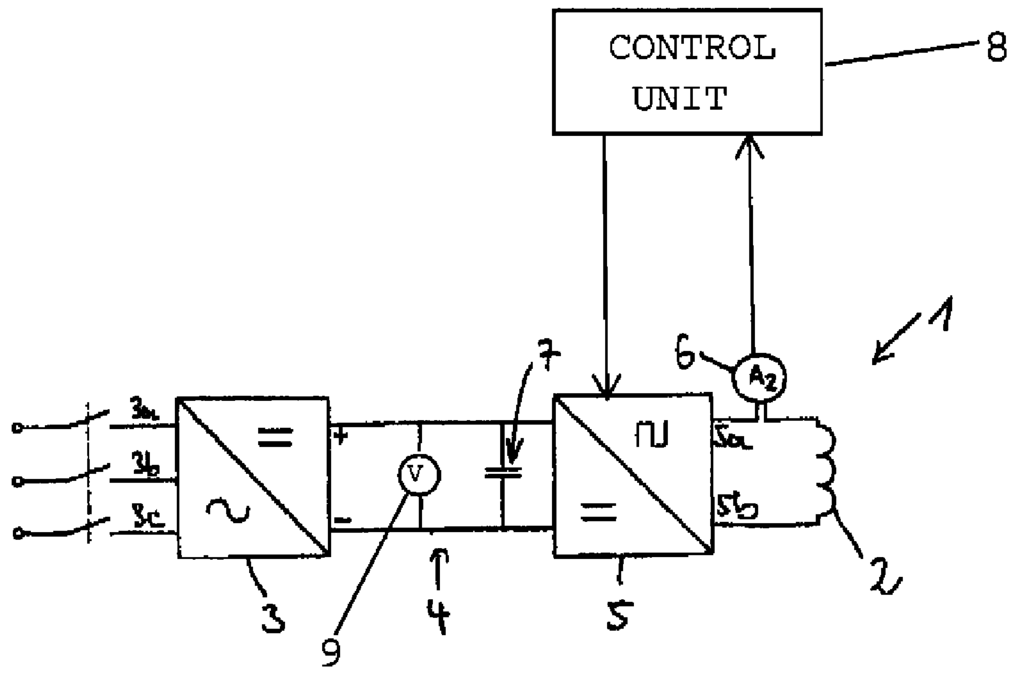

The circuit 1 furthermore comprises an inverter 5 for putting out an AC-voltage, having an input and an inverter output 5*a*, 5*b* for connecting the induction coil 2, an intermediary circuit 4 for connecting the rectifier 3 with the inverter 5, and a regulation unit for regulating the power supplied to the induction coil 2. A measurement apparatus 6 for measuring a voltage $A_2$ as an input variable for the regulation unit is connected to the output side of the inverter 5. A respective method for regulating the power supplied to the induction coil 2 comprises a regulation step, in which the current $A_2$ supplied to the induction coil 2 is used as an input variable for the regulation of the power supplied to the induction coil 2.

20 Claims, 1 Drawing Sheet

U.S. PATENT DOCUMENTS

| | | | | |
|---|---|---|---|---|
| 2002/0024828 | A1* | 2/2002 | Hayashi et al. | 363/35 |
| 2004/0062062 | A1* | 4/2004 | Lee et al. | 363/37 |
| 2005/0199614 | A1* | 9/2005 | Uchida et al. | 219/662 |
| 2009/0052209 | A1* | 2/2009 | Kaitani et al. | 363/37 |
| 2010/0181306 | A1* | 7/2010 | Gutierrez et al. | 219/660 |
| 2010/0202168 | A1* | 8/2010 | Kanno | 363/37 |

FOREIGN PATENT DOCUMENTS

| | | | |
|---|---|---|---|
| DE | 10215454 | C1 | 10/2003 |
| DE | 10361458 | A1 | 9/2005 |
| DE | 102004021217 | A1 | 12/2005 |
| WO | 2004004420 | A | 1/2004 |
| WO | 2005062448 | A2 | 7/2005 |

* cited by examiner

POWER SUPPLY CONTROL CIRCUIT FOR AN INDUCTIVE COIL USED TO HEAT A TOOL SHRINK ATTACHMENT

This application relates to a circuit for controlling the supply of electrical power to an induction coil, in particular to an induction coil for heating a shrink attachment for tools, comprising a rectifier, having an input for feeding input power and a rectifier output, an inverter for putting out AC-voltage, comprising an input and an inverter output for connecting the induction coil, an intermediary circuit for connecting the rectifier to the inverter, and a control unit for controlling the power supply to the induction coil, a power supply unit for feeding electrical power to an induction coil. Furthermore, the application relates to a shrink attachment for tools, comprising an induction coil for heating the shrink attachment by generating Eddy currents and/or by generating heat through change of magnetization, and a method for controlling the power supply to an induction coil, in particular to an induction coil for heating a shrink attachment for tools comprising a control step.

In lathes, milling machines, drill presses, and similar the tool is received in a tool holder. For precise and defined machining of a work piece, it is necessary to position the tool in the tool holder precisely. The use of shrink tool holders or shrink attachments has proven to be effective for positioning and fixating tools in the holder. For inserting the tool, the holder is initially heated. Due to the thermal expansion of the receiver of the shrink attachment, the tool can be inserted into the receiver opening and can be fixated therein by subsequent cooling. The positioning can thus be performed in a simple, precise and reliable manner.

For heating the shrink holder an induction coil can be used. This coil is supplied with an alternating voltage, however, care must be taken that the maximum load limit of the induction coil and of the power electronics is not exceeded. For this purpose, the power to be supplied can be pre-adjusted in most power supply units. However, it is appreciated that such adjustment possibilities are relatively imprecise and in particular a relatively large distance to the maximum load limit of the induction coil and of the power electronics has to be maintained.

An improved power supply unit, as illustrated in FIG. 1, comprises a rectifier 3, having inputs 3*a*, 3*b*, and 3*c*. An intermediary DC-circuit 4 is connected to the output of the rectifier. An inverter 5 converts the DC-voltage into AC-voltage in order to operate an induction coil 2. Typically an AC-voltage with a predetermined voltage, e.g. 360 V to 500 V, is used as an input voltage. Since the voltages of the provided power vary from country to country, the power supply unit has to be specially equipped, depending on the deployment location, e.g. with transformers, or with differently configured components.

Figure 2:
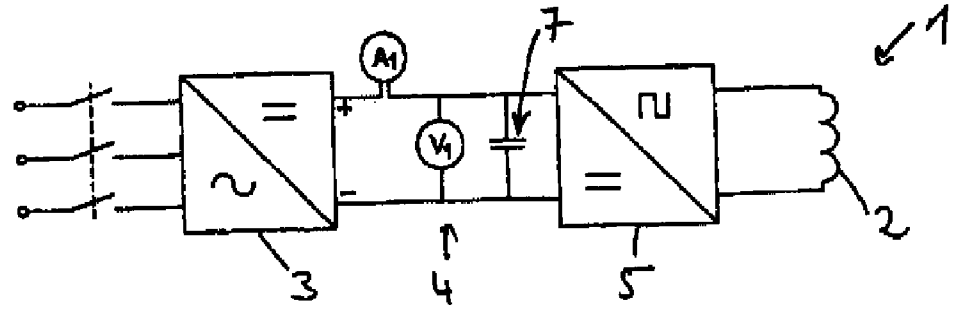
FIG. 2 (Prior Art)

As is apparent from FIG. 2, measuring equipment for measuring the voltage V1 and the current A are disposed on the DC-voltage side. These measurement values are being used as input values for a control unit (not shown) in order to control the power supplied to the coil 2. The control is performed by means of an actual 1 target comparison of the apparent output, wherein the voltage and current values V1 and A, measured in the intermediary circuit 4 are determined as actual value (mostly by the formula S=U×I). The determination of the apparent power from the values measured in the intermediary circuit is comparatively easy from a measurement technique point of view, since variations of the voltage and of the current over the course of time are not very pronounced. In particular, no significant voltage and current spikes occur. In the intermediary circuit, for example, no currents over 25 amperes occur, so that expensive and complex converter modules can be dispensed with. Thus, cost efficient components can be used for the measurement and determination of the actual values, e.g. converter modules, which are used for measuring the current.

With this type of control, it cannot be reliably avoided, that the maximum load limit of the induction coil is exceeded, in particular in case of voltage variations in the grid, and in case of power variations in the coil, from heating the coil. It has in particular also become evident, that the apparent power measured on the DC side only approximately corresponds to the power actually provided to the induction coil. This necessitates to oversize the modules, which are connected subsequent to the measurement means for measuring the control parameters. This means that the modules are typically operated well below their maximum load capacity as a precautionary measure against an overload by voltage spikes.

From DE 200 08 937 U1, an apparatus for inductively heating a chuck is known, which provides a measurement apparatus as an input parameter for the control unit, which can be connected at several locations of the supply circuit, and which preferably measures the voltage in the primary circuit of a transformer at the AC output. On the secondary side, the transformer is connected to the inductor coil or to the respective oscillating circuit. The apparatus provides control means on the secondary side for controlling the supply circuit and a filter. Through the circuit at the AC output, also in this apparatus, the measured apparent power only approximately corresponds to the apparent power, which is actually supplied to the induction coil.

DE 101 29 645 B4 discloses a method for welding plastic components, in which a contour wire is inductively heated by a coil at the welding location. Also this apparatus provides a current measurement for power limitation, wherein in this case, however, a tool is being heated and not a tool holder.

Based on this state of the art, it is the object of the present invention to improve the precision of the control of the power supply to an induction coil in particular for heating a shrink mount for tools, and to remove the disadvantages associated therewith.

This object is accomplished by providing a circuit according to claim 1, a shrink attachment for tools according to claim 7, and a method for controlling the power supply to an induction coil according to claim 8.

The circuit according to the invention for controlling the supply of electric power to an induction coil, in particular to an induction coil for heating a shrink attachment for tools, comprises a rectifier having an input for feeding an input power and a rectifier output, an inverter for putting out an AC-voltage, comprising an input and an inverter output for connecting an induction coil, an intermediary circuit for connecting the rectifier to the inverter, and a control unit for controlling the power supply to the induction coil. The circuit comprises a measurement apparatus for measuring a current as an input parameter for the control unit, wherein the measurement apparatus is connected to the output of the inverter.

The current measured at the inverter output is thus measured on the coil side with respect to the inverter. From the current measured in the conductor from the inverter to the coil, the power directly supplied to the coil at the point in time of measurement can be inferred. In other words, the present current flowing through the coil is directly measured. The input variable for the regulation thus directly corresponds to the actual control variable.

It is a particular advantage of this setup that no "smoothened" values like in the state of the art are measured by the shrinking technique, but the actual variable, which needs to be controlled. Thereby the measured power and the control are more exact in the present invention.

Consequently, the capabilities of the modules used in the circuit can be used to their full extent without having to run the risk of an overload of the coil and of the power electronics. In the present invention, thus the limit of the load of the components (e.g. of the IGBT-insulated gate bipolar transistor) can be reached. In other words, the components can be sized in an optimum manner and can be used up to their load capacity. In current circuits, however, partially larger components had to be used for overload protection, as already described above. The overload protection is optimized by the substantially increased precision of the measurement of the actual values. Since the load presently connected to the coil can be determined precisely, the load at the coil and at the power electronics, and thus the efficiency of the heating, can be substantially improved. Due to this increase of the loading of the coil, a substantially higher load than in the state of the art, e.g. at least 30% to 50% higher, can be connected to the coil, without reaching a critical range due to delays in the regulation, or due to a wrong determination of the actual power.

Preferably the intermediary circuit comprises a capacity, which smoothes the voltage in the intermediary circuit and reduces current peaks.

The inverter is configured in particular for generating an alternating voltage with predetermined frequency, in particular with a frequency of 5 kHz to 20 kHz, in particular 10 kHz at the inverter output. The frequency can be pre-adjusted invariably and it is optimized according to the application and according to the requirements.

The regulation unit regulates the power supply to the induction coil connected to the inverter output depending on the input variable, in particular by varying an impulse width of the a/c voltage generated by the inverter.

Shorter impulse widths in conjunction with frequency and voltage set constant mean less power. By means of this type of control, the power supply is independent from the input voltage at the rectifier inputs, since only the impulse widths are regulated and voltage fluctuations are compensated thereby. Thus, not only voltage fluctuations in the grid are compensated. The embodiment provides to the contrary that various input voltages can be used depending on the international standard (e.g. 400 V for Europe, 480 V for the U.S.). It is not necessary to use additional transformers like in the state of the art in order to accomplish an adaptation to requirements. Fluctuations or differences in the input and/or intermediary voltage are regulated automatically. This leads to a greater flexibility and to a universal circuit without substantially increasing the complexity of the entire circuit. The circuit can be operated in particular with a voltage, which is variable in a predetermined voltage range, in particular between 360 V and 500 V. The preferred voltage range comprises the standard values currently applicable in important industrialized nations.

The circuit can be operated in particular with single- or multiphase AC-voltage.

The object is also accomplished by providing a shrink attachment for tools, comprising an induction coil for heating the shrink attachment by generating Eddy currents and/or by magnetization heat and by one of the above mentioned circuits.

The circuit according to the invention has proven to be particularly useful for shrink attachments for tools. In this application area, a particularly exact supply of heat to the shrink attachment is desired, in order to facilitate a rapid and exact fitting of the tools into the shrink attachment. Furthermore, destroying the induction coil and the power electronics by exceeding the maximum load limit and by overheating the tool receiver shall be avoided through the precision of the adjustment of the heating time in spite of a supplied power reaching the maximum load of the components.

The object is additionally accomplished by a method for regulating the power supply to an induction coil, in particular to an induction coil for heating a shrink attachment for tools, comprising a control step, in which the current supplied to the induction coil is used as an input variable for controlling the power supplied to the induction coil.

By means of the regulation step, in which the power is determined by a measurement of the output current value, a substantially real time and exact control or regulation is facilitated. The load of the coil can be substantially increased by the achieved precision without the risk of exceeding a critical load limit.

The load supplied to the induction coil can be determined by using the impedance of the coil and the current measured by a measuring apparatus. An additional measurement of the voltage can thus be dispensed with.

The method preferably provides that the size of the shrink attachment for tools, in particular the size of a shrink holder, is automatically determined by means of the measured voltage. Thus, the parameters for various shrink attachments for tools do not have to be manually adjusted anymore, but they can be stored e.g. in the machine controls.

The input voltage is preferably measured for automatic determination of the size of the shrink attachment for tools. Preferably, the input voltage is determined by a voltage measurement in front of the rectifier, or in the intermediary circuit, or in the coil circuit. Thus, the measurement of the size of the shrink attachment for tools is possible, also in case of a change of the input voltage caused by the shrink process. Overheating the shrink attachment for tools due to a wrong determination of its size can thus be avoided.

An AC-voltage with predetermined frequency in particular with frequency of 5 kHz to 20 kHz is preferably supplied to the induction coil.

The control of the power supply to the induction coil is performed in a particular embodiment by a variation of an impulse width of the a/c voltage. The power supplied to the coil can thus also be kept constant in a reliable manner, when the input values and/or the physical properties of the components, are changed, or when external influences occur. Furthermore, the method can be used for voltage values corresponding to different industry standards, e.g. for 360 V, 400 V, or 500 V.

The method is performed in particular on a circuit as described above.

Additional features and advantages of the invention can be derived from the subsequent description of a particular embodiment. It is shown in:

FIG. 1 a particular embodiment of the circuit according to the invention; and FIG. 2 a corresponding circuit according to the state of the art.

In FIG. 1, a circuit 1 according to the invention for controlling the electric power supply to an induction coil 2 is illustrated. The circuit is implemented on a circuit board and thus constitutes a control circuit board for the power supply to the coil 2.

The induction coil 2 serves in particular for heating a shrink attachment for tools. The induction coil 2 generates an alternating electromagnetic field, to which the shrink attachment is coupled. By means of the Eddy currents generated in the shrink attachment and/or through changing the magnetization of a shrink attachment comprised of ferromagnetic material, heat is generated, so that a shrink attachment expands, so that the tool can be inserted.

In the heating process, it is desired to provide a possibly constant maximum power to the induction coil 2, taking the maximum permissible load of the components into account. By all means, it has to be avoided, on the one hand, that the maximum load limit of the induction coil 2 and of the power electronics are exceeded, on the other hand, a power, which is as high as possible, shall be provided to the coil 2, in order to effectively perform the heat up process and to avoid an overheating of the tool receiver.

Besides the coil, the circuit comprises a rectifier 3 with input terminals 3*a*, 3*b*1 and 3*c*, through which an input voltage, e.g. a/c power, is supplied. An intermediary circuit 4 connected to the output of the rectifier 3 substantially comprises a capacitor 7, which is charged or discharged depending on the flow-through direction of the current through the coil 2.

An inverter 5, whose input is connected to the intermediary circuit 4, generates a modulated, substantially rectangular AC-voltage with a frequency of 5 kHz to 20 kHz. The frequency is adjustable and can be preset by the user. The AC-power fed by the rectifier 3 into the intermediary circuit 4 is fed through the output of the intermediary circuit 4 into the input of the inverter 5.

The AC-voltage generated by the inverter 5 is connected to the output connections 5*a* and 5*b* of the inverter 5. The coil 2 is connected to these connections 5*a* and 5*b*.

Between the connections 5*a* and 5*b*, the coil 2 is connected. Furthermore, a voltage measurement apparatus is disposed in this portion, which measures the actual current that flows through the coil. For measuring the current $A_2$, any suitable current measurement device 6 can be used. In the course of a voltage measurement according to the present invention, it needs to be considered, however, that much higher currents occur, to the contrary to a current-/voltage measurement in the intermediary circuit 4, re. FIG. 2. As a peak load, e.g. up to 400 ampere can flow in the intermediary current circuit 4, compared to 25 ampere, so that in the solution according to the invention components accordingly sized with respect to their measurement range, e.g. converter modules have to be used.

On the other hand, an additional voltage measurement can be dispensed with, since the power can be determined from the voltage and from the impedance of the system.

The measured actual values or the actual values determined from the measurement values of the current or the power are received by a regulation or control unit 8 as input values. The regulation can e.g. be performed based on an actual target comparison of a desired power determined and set for the coil 2 with an actual power, derived from the measured current. After the actual/target comparison with a predetermined value, the power supply from the inverter 5 to the coil 2 is regulated as required.

The control unit 8 can be connected to the circuit 1, or integrated into the circuit 1.

By means of the circuit 1, the control becomes more precise and more effective, since when measuring the input variables in the intermediary circuit 4, the currents in the coil 2, occurring as a consequence of the impedance of the coil 2, can only be considered in approximation.

The control unit 8 regulates the supplied power in the embodiment based on a variation of the impulse width of the control signal of the inverter 5. A larger impulse width at constant voltage means a higher supplied power. The control unit 8 always regulates so that voltage variations, which reach the inverter input are compensated. Thus, also the output power at the inverter is independent from the input voltage at the rectifier 3 within a certain voltage range, which comprises all international standard voltages in the best case. This way, the circuit can be used without modifications within the international standards.

This way, the circuit known from the state of the art, compare FIG. 2, is simplified by a smaller requirement of components. Furthermore, the precision of the regulation is improved.

In case of a higher precision of the regulation, however, the unit can be operated with components, whose power capacity can be used almost to its full extent. The risk of an overload of the coil 2 is reduced by a substantially real time and precise regulation. Furthermore, in particular through the consideration of the phase shift between voltage and power, no significant deviations between the power spikes actually occurring and the power values measured e.g. in the intermediary circuit have to be expected. Due to this increase of the coil loading, a substantially higher load can be applied to the coil, compared to the state of the art, and overheating the tool receiver can be avoided.

The method preferably provides that the size of the shrink attachment for tools, in particular the size of a shrink holder, is automatically determined by means of a measured input voltage. Thus, the parameters for various shrink attachments for tools do not have to be manually adjusted anymore, but they can be stored e.g. in the machine controls.

The input voltage is preferably measured for automatic determination of the size of the shrink attachment for tools. Preferably, the input voltage is determined by a voltage measurement apparatus 9 which may be in front of the rectifier, or in the intermediary circuit, or in the coil circuit (as shown in FIG. 1, the voltage measurement apparatus 9 is in the intermediary circuit). Thus, the measurement of the size of the shrink attachment for tools is possible, also in case of a change of the input voltage caused by the shrink process. Overheating the shrink attachment for tools due to a wrong determination of its size can thus be avoided.

What is claimed is:

1. A shrink attachment for tools, comprising an induction coil heating the shrink attachment by generating Eddy currents and/or by generating heat from the change of magnetization, and a circuit comprising:

a rectifier, having an input for feeding an input power, and a rectifier output, an inverter for putting out an AC-voltage, having an input and an inverter output for connecting the induction coil, an intermediary circuit for connecting the rectifier to the inverter, and a regulation unit for regulating the power supplied to the induction coil, wherein the circuit for controlling comprises a measurement apparatus for measuring only current supplied to the induction coil as an input variable for the regulation unit, wherein the measurement apparatus is connected to the output side of the inverter, wherein the current supplied to the induction coil is used as an input variable for the regulation of the power supplied to the induction coil.

2. A circuit for controlling the supply of electrical power to an induction coil heating a shrink attachment for tools, comprising:

a rectifier, having an input for feeding an input power, and a rectifier output, an inverter for putting out an AC-voltage, having an input and an inverter output for connecting the induction coil, an intermediary circuit for connecting the rectifier to the inverter, wherein the intermediary circuit comprises a capacitor, and a regulation unit for regulating the power supplied to the induction coil, wherein the circuit for controlling comprises a measurement apparatus for measuring only current supplied to the induction coil as an input variable for the regulation unit, wherein the measurement apparatus is connected to the output side of the inverter, wherein the current supplied to the induction coil is used as an input variable for the regulation of the power supplied to the induction coil.

3. A circuit according to claim 2, wherein the inverter is configured for generating an AC-voltage with a predetermined frequency at the inverter output.

4. A circuit according to claim 3, wherein the predetermined frequency is 5 kHz to 20 kHz.

5. A circuit according to claim 4, wherein the predetermined frequency is 10 kHz.

6. A circuit according to claim 2, wherein the circuit can be operated with single phase AC-power or with multiphase AC-power.

7. A circuit according to claim 6, wherein a voltage range of the single phase AC-power is between 210 V and 250 V.

8. A circuit according to claim 6, wherein a voltage range of the multiphase AC-power is between 360 V and 500 V.

9. A circuit according to claim 2, wherein the regulation unit regulates the power supplied to the induction coil, connected to the inverter output, depending on the input variable, by varying the impulse width of the AC-voltage, generated by the inverter.

10. A circuit according to claim 2, wherein the circuit can be operated with a voltage, which is variable in a predetermined voltage range.

11. A circuit according to claim 10, wherein the predetermined voltage range is between 360 V and 500 V.

12. A method for controlling the power supply to an induction coil heating a shrink attachment for tools, comprising a regulation step, in which the current, supplied to the induction coil, is used as an input variable for controlling the power supplied to the induction coil, and wherein the method is performed on a circuit, the circuit comprising:

a rectifier, having an input for feeding an input power, and a rectifier output, an inverter for putting out an AC-voltage, having an input and an inverter output for connecting the induction coil, an intermediary circuit for connecting the rectifier to the inverter, wherein the intermediary circuit comprises a capacitor, and a regulation unit for regulating the power supplied to the induction coil, wherein the circuit comprises a measurement apparatus for measuring only the current supplied to the induction coil as an input variable for the regulation unit, wherein the measurement apparatus is connected to the output side of the inverter, wherein the current supplied to the induction coil is used as an input variable for the regulation of the power supplied to the induction coil.

13. A method according to claim 12, wherein an AC-voltage with a predetermined frequency is supplied to the induction coil.

14. A method according to claim 13, wherein the regulation of the power supplied to the induction coil is performed by a variation of an impulse width of the AC-voltage.

15. A method according to claim 13, wherein the predetermined frequency is 5 kHz to 20 kHz.

16. A method according to claim 15, wherein the predetermined frequency is 10 kHz.

17. A method according to claim 12, wherein the power supplied to the induction coil is determined using the impedance of the coil and the current, measured by the measurement apparatus.

18. A method according to claim 12, wherein the size of the shrink attachment for tools is automatically determined by means of the measured current.

19. A method according to claim 12, wherein an input voltage is measured.

20. A method according to claim 12, wherein an input voltage is determined by a voltage measurement in front of a rectifier, or in an intermediary circuit, or in a coil circuit.

* * * * *